UNITED STATES PATENT OFFICE.

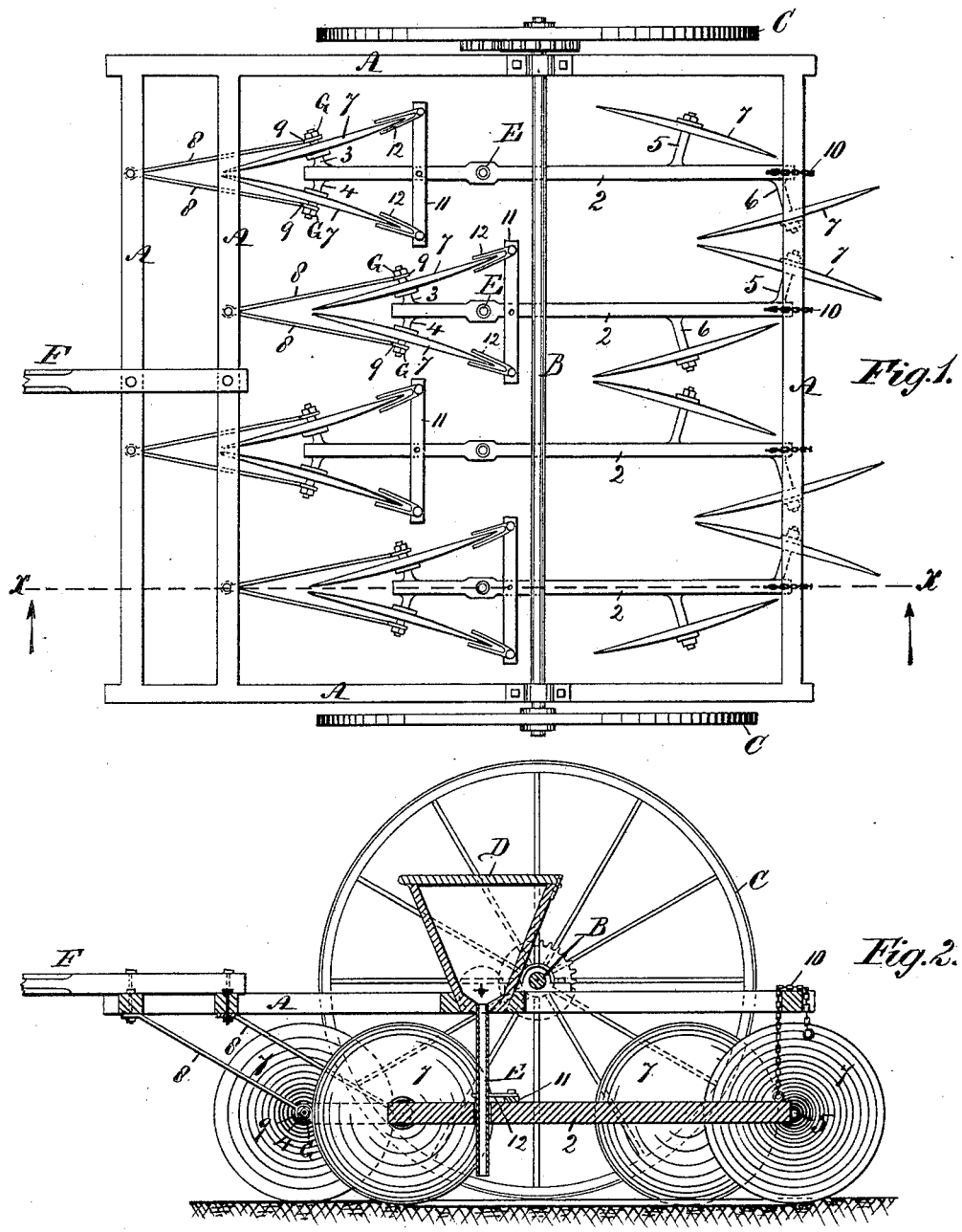

ISAAC ALLAN COWIE, OF MORDEN, CANADA.

SEEDING-MACHINE.

SPECIFICATION forming part of Letters Patent No. 461,011, dated October 13, 1891.

Application filed August 3, 1891. Serial No. 401,480. (No model.) Patented in Canada June 2, 1891, No. 36,713.

*To all whom it may concern:*

Be it known that I, ISAAC ALLAN COWIE, of Morden, in the county of Dufferin, in the Province of Manitoba, in the Dominion of Canada, have invented certain new and useful Improvements in Seeding-Machines, (for which I have obtained a patent of the Dominion of Canada, No. 36,713, dated June 2, 1891;) and I do hereby declare that the following is a full, clear, and exact description of the same, reference being had to the accompanying drawings, in which—

Figure 1 is a plan or top view of a seeding-machine embodying my invention, the seed-box omitted to clearly show the underlying parts; and Fig. 2 is a section of the same on line *x x*, the seed-box included.

My invention relates to a drill seeding-machine, and has for its object to open channels in the soil, in which channels the seed is deposited by the seed-tubes and then covered by returning the soil, whereby the soil will be left in ridges to afford protection to the seed from being bared or exposed by high winds.

My invention consists of a number of bars or reaches suspended horizontally in line with the draft from the main frame of a suitable seeding-machine, said bars or reaches having short axles near the front and rear ends, said axles carrying circular disks rotating diagonally to the line of draft, whereby two front disks will open the channel to receive the seed and two rear disks will close the soil over the seed, as hereinafter set forth.

A is the main frame of a seeding-machine, mounted on an axle B, carried by the ground-wheels C C.

D is the seed-box on top of the main frame, E the seed-tubes pendent from the seed-box, and F the tongue to which the draft is attached, all of which are of the ordinary character, and the seed is fed into the tubes by the usual device in the seed-box.

Below the frame A is suspended therefrom a series of bars or reaches 2, corresponding in number to the number of the seed-tubes, said bars suspended in line with the draft horizontally, and said bars or reaches have stub-axles or axle-arms 3 4 forward of the main axle B, and rearwardly of said axle said reaches or bars have stub-axles or axle-arms 5 6, the rear axle-arms somewhat longer than the front arms, and the front axle-arms incline forwardly and the rear axle-arms incline rearwardly.

7 are concavo-convex circular disks sleeved to turn or rotate one on each of the front and rear axle-arms 3 4 5 6, the front disks converging forwardly in pairs and the rear disks converging rearwardly in pairs, one slightly in advance of the other, whereby the front disks will open a channel in the soil to receive the seed deposited from the seed-tubes and the rear disks close the soil upon the seed and leave a ridge of soil above the seed to afford protection from high winds.

Each bar or reach 2 is attached forwardly to the main frame by a yoke 8, connecting collars 9 9, each sleeved loosely on an axle-arm, and said collars are kept on said arms by a nut G, screwing thereon. The rear end of each bar or reach 2 is suspended from the main frame A by a chain 10, which keeps the reach in line with the draft, and by loosening and tightening said chain the depth of the seed-channel may be increased or diminished.

11 is a bar secured transversely to the reach, and to said bar fingers 12 are attached to clean the front disks.

I claim as my invention—

The combination, with a seeding-machine, of bars or reaches 2, having on the vertical sides stub-axles or axle-arms 3 4 5 6, each provided with a circular rotary disk 7, sleeved on said arms, said reaches suspended flexibly from the main frame of the seeding-machine in line with the draft, the front disks in pairs converging forwardly to open a channel in the soil in advance of the seed-tubes, and the rear disks in pairs converging rearwardly to cover the seed deposited in said channel by the seed-tubes, as set forth.

ISAAC ALLAN COWIE.

Witnesses:
C. R. DUNSFORD,
HARTLEY DUNSFORD.